INVENTOR
FLOYD E. SHUPP
BY
Hammond and Littell
ATTORNEYS

Feb. 20, 1968     F. E. SHUPP     3,369,307
TAPE RECORDER TAPE VIEWING SYSTEM AND TEACHING MACHINE
Filed Oct. 23, 1965     5 Sheets-Sheet 5
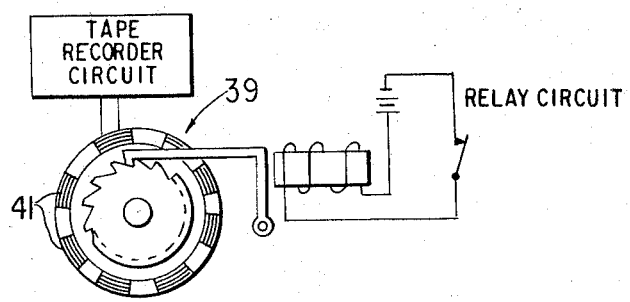
FIG. 9
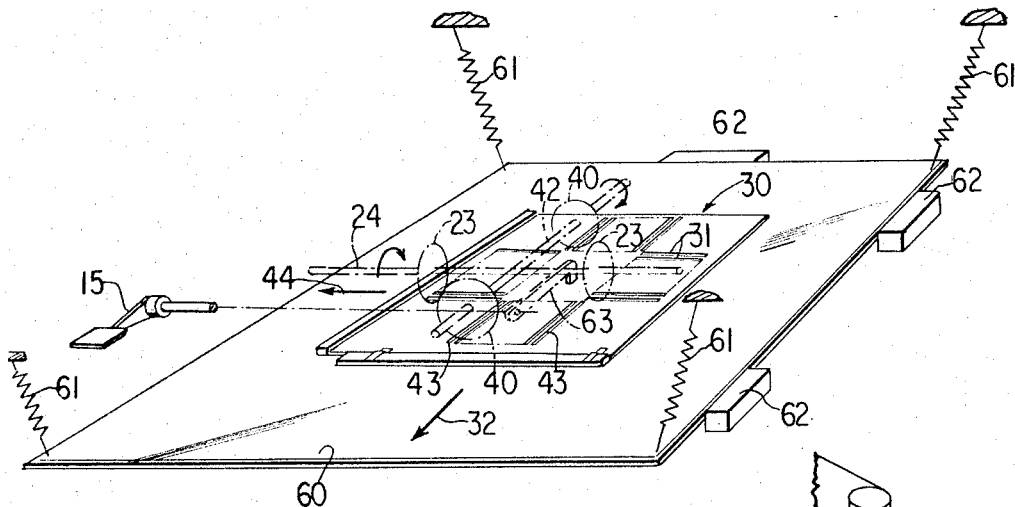
FIG. 8
FIG. 4a
INVENTOR
FLOYD E. SHUPP
BY
Hammond and Littell
ATTORNEYS

United States Patent Office 3,369,307
Patented Feb. 20, 1968

3,369,307
TAPE RECORDER TAPE VIEWING SYSTEM
AND TEACHING MACHINE
Floyd E. Shupp, 1 Shore Road,
East Patchogue, N.Y. 11772
Filed Oct. 23, 1965, Ser. No. 503,583
5 Claims. (Cl. 35—9)

ABSTRACT OF THE DISCLOSURE

This invention relates to a teaching machine used in conjunction with a conventional tape recorder, which supplies the drive and the tape regression. The teaching machine involves a tape containing both audio and visual matter which is passed through a conventional tape reproducing head and a visual viewing means. The operation of the machine is controlled by the student's selection of proper answers to either visual or audio questions. The ratio of incorrect selections is determined, and if it falls below a predetermined value the tape recorder is automatically reversed and stopped at a predetermined point in the progression of the lesson.

---

Most of the moderately priced teaching machines in present use fall under one of two categories, the "Pressy" type and the "Skinner" type. With the "Pressy" machine the individual selects an answer from a number of alternatives. Only if the student chooses correctly, does the machine permit him to go on to the next question or selection. This "permission" constitutes the reward for a correct answer and the withholding of it is the punishment for an incorrect choice. The last response made must be the correct response, an arrangement considered to facilitate the learning and retention of an association. This type of machine, however, tests only the student's ability to recognize the correct response when he sees it. Although this ability is valuable as in language translation and comprehension, it represents a lower level of learning than does the ability to recall the correct response well enough to construct it.

The "Skinner" type machine (or programmed text) does allow for the construction of the response. Typically, the question is presented, the student constructs a response, and then the machine presents the correct answer for comparison with the student's answer. The constructed response may be written, as in Skinner's own machines, oral as in presently used taped language pronunciation drills or mental as in programmed text books. The presentation of the correct answer serves to immediately reinforce correct answers and to punish and correct incorrect answers. This procedure, however does not insure that the student's last response (or any of his responses) will be correct.

Present day audio-visual teaching machine systems have many other drawbacks. Most of these center around the fact that flexibility and versatility cost too much in the way of machine and/or system complexity. This complexity means first that the initial cost of a reasonably versatile machine is likely to be so high as to make very unlikely its widespread employment either in the schools or in the homes. Second, an almost inevitable consequence of complexity is the maintenance problem—predisposition to break down, availability of repair service, availability of spare parts, etc.

Accordingly, it is an object of this invention to provide a teaching machine which can function in both the "Pressy" and "Skinner" modes and which has the capacity to handle more efficient instructional programs in more areas than either the "Skinner" or "pressy" machines.

Another object of this invention is to provide a teaching machine that is designed to employ any standard tape recorder as both the program advancing mechanism and the sound system.

Another object of this invention is to provide a teaching machine that can present material to be learned and/or questions and/or feedback separately in any sequence or simultaneously through audio and/or visual media.

A further object of this invention is to provide a teaching machine that offers convenient and compact storage of large amounts of instructional material in both audio and/or visual media.

Another object of this invention is to provide a teaching machine that makes possible the immediate auditory review of the instructor's oral example and the student's imitation of that example without reversing and replaying.

Still another object of this invention is to provide a teaching machine which may give hints or reveal what was wrong with the incorrect answer chosen or give added reinforcement when the correct answer is chosen.

Another object of this invention is to provide a teaching machine that conducts a "dialogue" with the student by providing choices and clues for each question asked.

Another object of this invention is to provide a teaching machine which incorporates a "score card" exhibiting a continuous report on the level of the student's performance computed from both the number of attempts and the number of correct responses.

Another object of this invention is to provide a teaching machine which incorporates a score card which gives special notice of below-par performance, and constitutes a "decision making" center and switching apparatus needed to return the student to a lower level of difficulty by reversing the program when a student falls below an instructor-determined level of proficiency.

Yet another object of this invention is to provide a teaching machine that offers a versatility and flexibility not found in any of the prior art machines of comparable cost and complexity.

The teaching machine of this invention (which will hereinafter be called a Tape Teacher) accomplishes all of the aforementioned objects and overcomes all of the aforementioned drawbacks of the prior art by virtue of being designed to employ any standard tape recorder as both the program advancing mechanism and the sound system.

The invention will best be understood by reference to the drawings in which,

FIG. 4a is a view taken along the line 4a in FIG. 4;

FIG. 6 is a cross-section showing the major mechanical features of the Tape Teacher;

FIG. 7 is a partial cross-section showing the electrical contact through a tape perforation;

FIG. 8 is a perspective of the score card return mechanism in the Tape Teacher;

FIG. 9 is a schematic view of the relay device.

Figure 1:
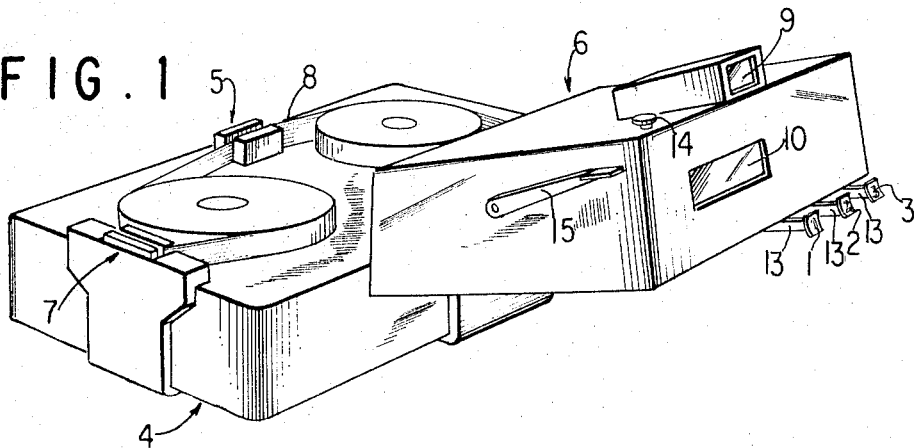
FIG. 1 is a perspective view of the Tape Teacher device attached to a conventional tape recorder.
Figure 2:
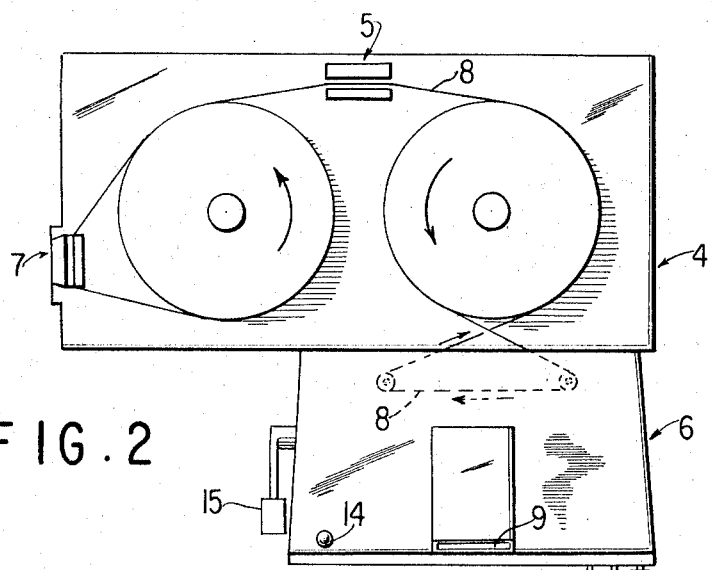
FIG. 2 is a top view of the arrangement in FIG. 1.
Figure 3:
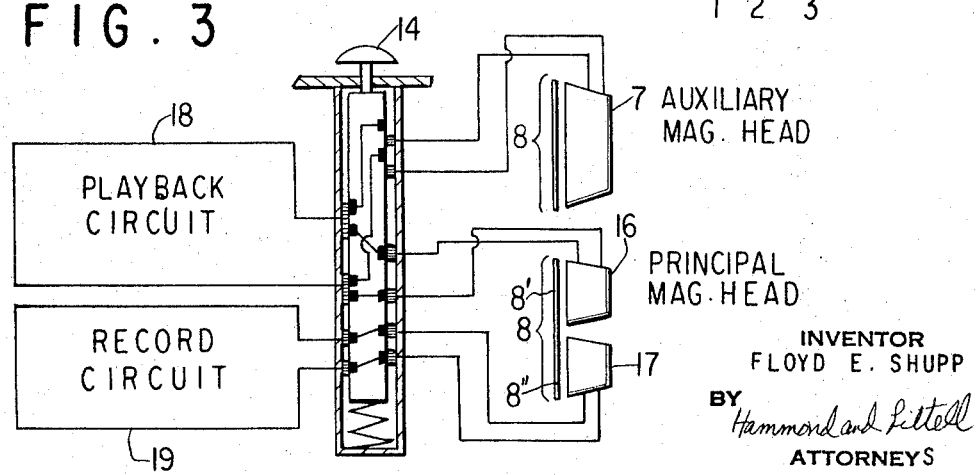
FIG. 3 is a schematic illustration showing some of the circuitry and switching of a dual track tape recorder as adapted to the Tape Teacher.

As shown in FIGS. 1 and 2 the Tape Teacher is mounted on a tape recorder 4. The Tape Teacher comprises a box 6 and auxiliary magnetic head 7. Tape recorder 4 has a principal magnetic head 5 which, as shown in FIG. 3 has both an upper portion 16 and a lower portion 17. The Tape 8, having an upper track 8' and a lower track 8" is fed from a feed reel into Tape Teacher box 6, then from box 6 through the principal magnetic head 5 of tape recorder 4 and thence through the auxiliary head 7 of the Tape Teacher and then to a take-up reel. As the tape 8 passes through box 6, the student may view the tape through viewer window 10. Tape 8 may conveniently contain words for an exercise in pronunciation or questions which the student would be required to answer by selecting an appropriate answer which may also be indicated on the tape. In addition, if the student selects the wrong answer an appropriate clue may be presented to the student to enable him to reach the right answer. It will be appreciated that in addition to the visual exercise that the students sees, the lesson may also be augmented by sound recordings on the tape which would implement and re-enforce the learning process. Such would be the case, for example, in a pronunciation drill. FIG. 4a shows what a sample tape 8 may look like. Reference numeral 48 demonstrates a sample question and three answer choices. The student would only see the left hand portion of the tape, as divided by hairline 49, through viewer window 10. The right hand portion of the tape would be obstructed from the student's view by shutters 25, 26 and 27. After reading the question, the student would then select the number corresponding to the answer which he thinks is the correct one. The correct answer to the sample question in FIG. 4a would be 12 inches and the number corresponding to this answer would be (3). If the student chose answer (3) he would then depress a button 3 (FIG. 1), thereby actuating a series of levers in a manner which will be more fully described, and shutter 27 will fall, thereby revealing that the student chose the correct answer by the marking 55 on tape 8. In the event that the student chose a wrong answer, the corresponding shutter 25 or 26 would fall, thereby revealing a clue 54 which would help the student to choose the correct answer. As the student proceeds with various questions that may be on the tape, a score is indicated in score window 9. The mechanism for accomplishing the scoring will be described hereinafter.

In order to describe the Tape Teacher system and operation a tour through a language lesson will be helpful.

First, the student listens to words recorded on the upper track 8' (FIG. 3) of the tape 8 as the tape passes before the upper principal magnetic head 16 which is connected to the play-back circuit 18 of tape recorder 4. The student then pronounces the same word into a microphone connected with the lower principal magnetic head 17 which, since it is connected with the record circuit 19, effects the recording of the student's pronunciation on the lower track 8" of the tape 8. In the meantime, the tape 8 with both pronunciations recorded on it is traveling toward the auxiliary magnetic head 7. Provided that the auxiliary head 7 is so placed that there is sufficient tape distance between the two heads to hold the instructor's example and the student's copied pronunciation, the student will have time to depress the switch 14 which will disconnect both portions of the principal head 5 and connect the auxiliary head 7 which spans both tracks to the play-back circuit 18. This will enable the student to audit both the instructor's criterion and his own pronunciation attempt immediately after he has made this attempt. He might also have viewed the words in viewer window 10 of the Tape Teacher box 6 through which the tape passes, either while pronouncing and/or while auditing. Since the switching for a dual track tape recorder is more complicated and since this type is in common use in the language laboratory, FIG. 3 described above pictures such a switch and its connection to the tape recorder circuit. The same sequence of pronunciations is possible with a single track recorder.

Although only one positioning of the auxiliary magnetic head 7 and the Tape Teacher box 6 relative to the feed and take-up reels is shown in FIG. 2, any other arrangement that would allow the tape to be viewed as passing through the viewer of the Tape Teacher box 6 from left to right and at the same time allow the tape to pass through the principal magnetic head a sufficient tape distance before it passes through the auxiliary magnetic head would be satisfactory. An advantage of securing the Tape Teacher's auxiliary head to the tape recorder independently of the housing is that the tape distance between the magnetic heads can be varied (in order to accommodate words and phrases of varying lengths) independently of the tape distance between the principal magnetic head and the viewer which must remain constant in order to maintain audio-visual signal synchronization.

As noted by the above tour through the pronunciation drill, the Tape Teacher provides a means whereby the student can both hear and view the lesson at the same time. As with the Tape Recorder Tape Viewing System, of my previous copending application Ser. No. 372,288, when the material is heard and viewed at the same time, synchronization between the written and spoken word is achieved by adjusting the tape distance between the principal magnetic head and the viewer.

In addition to being able to both view and hear the lesson, the Tape Teacher also provides means for establishing a question and answer dialogue between student and machine and also means for grading and scoring the student's performance. A continuation of the tour will demonstrate the operation of the Tape Teacher in this respect.

The tape 8 moves in substantially the same manner through the tape recorder 4 and Tape Teacher as was previously described in the language and pronunciation drill. However, in the pronunciation drill, the tape could continously pass by the viewer window 10 and the lesson could be conducted in a relatively continuous manner. In testing the student's ability to recall information and answer questions it is necessary to halt the tape at a point so that questions may be presented before the student through viewer window 10.

The switching off or halting of the tape may best be described by reference to FIG. 5. FIG. 5 shows the circuit diagram comprising a forward circuit and a reverse circuit. The tape will be on the forward circuit only when forward contact cluster 36 is engaged with forward insert 35 which is on the underside of scoreboard 30. In a like manner, the tape will be on the reverse circuit only when reverse contact cluster 38 is in contact with reverse insert 37 which is also on the underside of scoreboard 30. In adidtion, the shape and position of the two inserts 35 and 37 is such (see FIGS. 4 and 5) that either the forward contact cluster 36 is in contact with the forward insert 35 or the reverse contact cluster 38 is in contact with the reverse insert 37, but in no case both. The score card with its inserts is movable and the contact clusters are stationary. Both the forward and reverse contact clusters comprises four individual contacts which are not in contact with each other. Both the forward circuit and reverse circuit are connected to the rotary on-off relay 39. The rotary relay 39 (FIG. 9) is of a conventional type having eight contacts 41. Closing of the rotary relay circuit effects a one-sixteenth rotation of the contact disc which positions a contact 41 to close the tape recorder circuit on every second closing of the rotary relay circuit. In addition, every second closing of the rotary relay move the success gears 40 one notch on score card 30. This is effected by a shaft connected between rotary relay 39 and success gears 40. The movement of the success gears 40 is an integral part of the operation of the scoring system which will be described hereinafter. When forward contact cluster 36 is in contact with forward insert 35 the forward circuit would include a connection from the forward relay 45 to forward contact cluster 36, a connection from forward contact cluster 36 to contact 51 which, as shown in FIG. 5, is insulated from contact 67 by tape 8, a connection from contact 67 to rotary relay 39 and contact 34, a connection from contact 68 to forward contact cluster 36 and rotary relay 39, and a connection from rotary relay 39 to the forward relay 45 and forward contact cluster 36. As depicted in FIG. 5, the forward circuit is open as contacts 51 and 67 are insulated by tape 8 and contacts 34 and 68 are separated by answer slot 46 in tape 8. As the tape moves in a forward direction, an off forward slot 50 will eventually pass between contacts 51 and 67, thereby closing the rotary relay circuit and effecting a one-sixteenth rotation of the contact disc, thereby positioning contacts 41 in an off position which stops the movement on the tape. At this point a question is presented to the student through viewer window 10. A sample tape and question is shown in FIG. 4a.

The off forward slot 50 is arranged on the tape in such a manner that the correct answer slot 46 in the tape is directly behind the flexible contact 33 attached to the appropriate answer lever 28 in FIGS. 6 and 7. This will allow the flexible contact 33 to pass through the tape 8 and engage the receiving contacts 34 and 68 when the lever 28 corresponding to the correct answer is depressed and assure that the tape insulates the flexible contacts 33 from the receiving contacts for incorrect choices 47. If the correct answer is chosen, the forward circuit will again be closed, thereby activating the rotary relay 39 and again effecting a one-sixteenth rotation of the contact disc. This will start the tape moving in a forward direction until another off-forward slot passes between contacts 51 and 67. Instead of having contact 68 as shown in FIG. 5, the connection from contact 68 to the rotary relay 39 and forward contact cluster 36, may be accomplished by having only one contact 34. Such an embodiment is shown in FIG. 7. In this embodiment a wire 69 would be connected directly from flexible contact 33 to rotary relay 39 and forward contact cluster 36.

After the student has chosen the correct answer he would depress the number corresponding to the correct answer. This would cause members 13 and 20 (FIG. 6) to pivot about points 21. Member 28 is fixed to member 20 at point 27 and would move in a leftward direction toward the tape. In addition to effecting a movement of the tape by closing an electrical circuit, the depression of lever 13 also regulates a scoring system. The mechanism of the scoring system will now be described.

Figure 4:
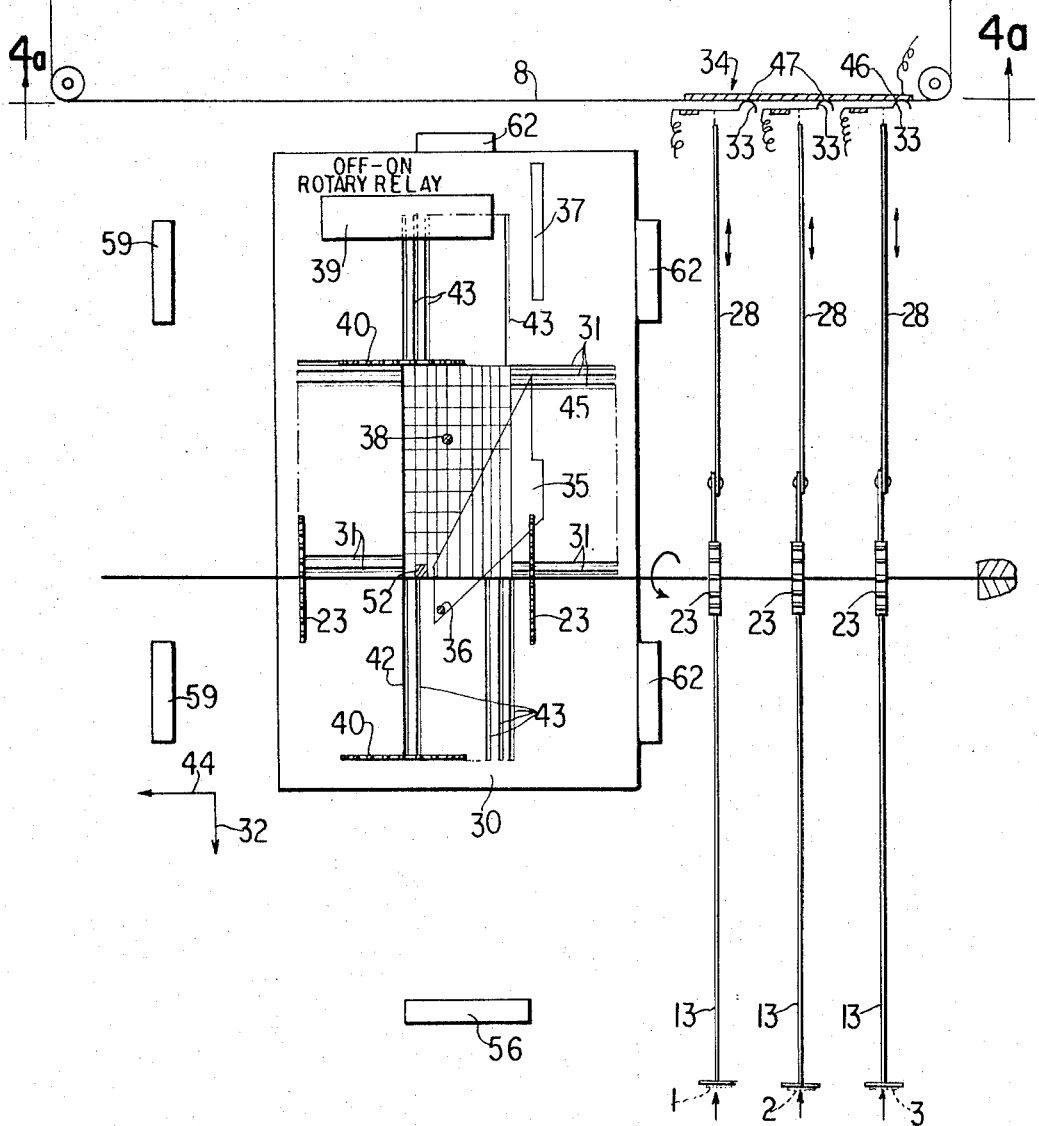
FIG. 4 is a top schematic view showing partial details of the Tape Teacher.
Figure 5:
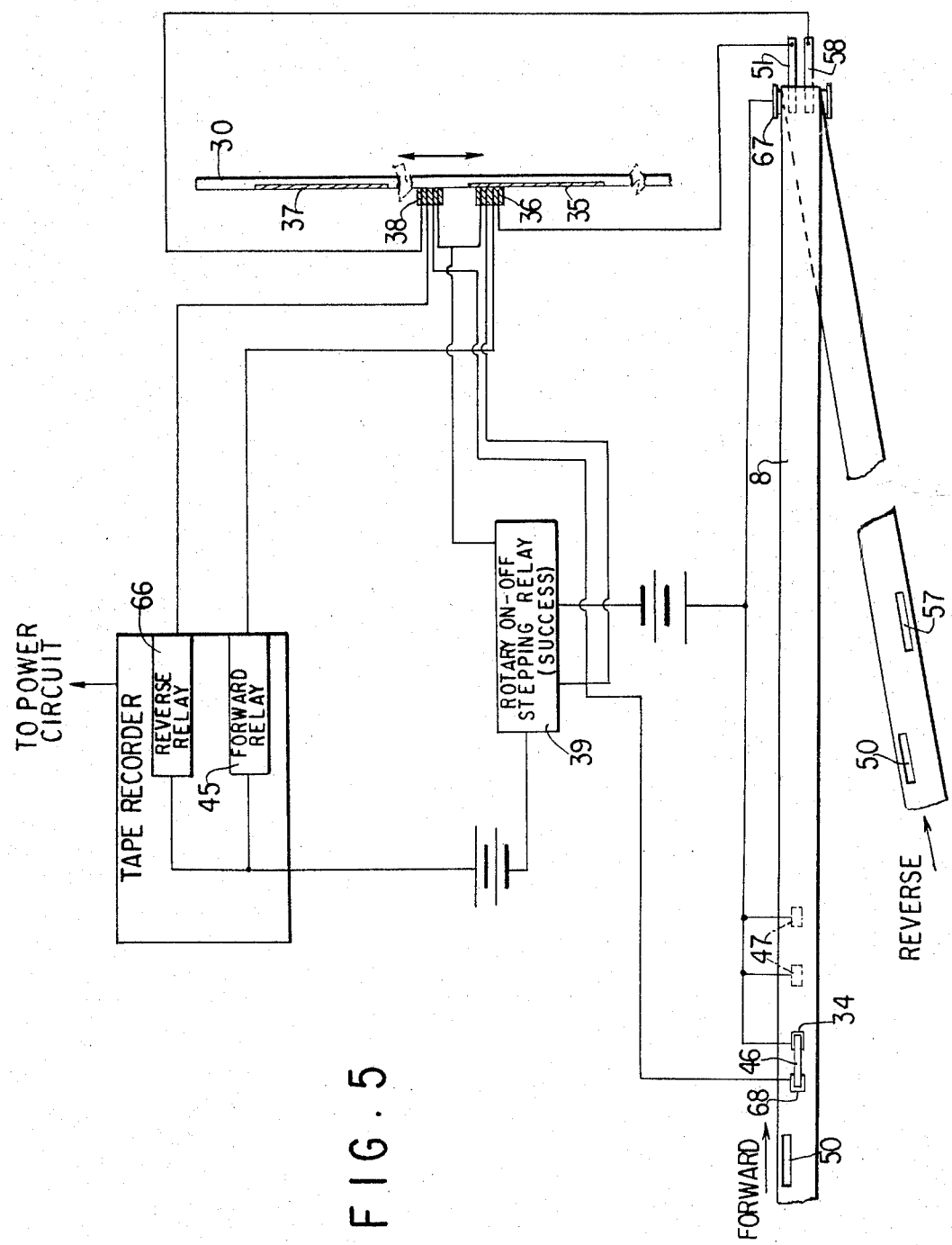
FIG. 5 illustrates a circuit for the electrical components of the system excluding the auxiliary head.

The scoring mechanism, as shown in FIGS. 4, 6 and 8, comprises scoreboard 30, frame 60 on which the scoreboard rests, springs 61 which support the frame 60 within Tape Teacher box 6, success gears 40 mounted on the ends of shaft 42 which is geared as to advance the score card 30 by engagement with grooves 43 one unit to the student's left along a success row 44, attempt gears 23 mounted on the ends of shaft 24 which is geared to advance the score card by engagement with grooves 31 one unit towards the student along an attempt row 32. The score card is divided into square units, each unit having a score, which is made visible to the student by means of window 52, mirror 53 and score window 9. As the student engages in successful attempts to answer the questions the score card 30 is advanced toward him and to his left one unit (square) at a time causing a new score to appear in the window 52. As the student engages in unsuccessful attempts the score card will only move along the attempt row and the student's score will indicate a failure to answer the question correctly. Attempt gears 23 are engaged with member 20 by member 22 and move one notch along grooves 31 in score card 30 whether the correct answer or the incorrect answer is chosen. Member 22 is preferably flexible so that it may return to its resting position after driving gear 23.

The completion of the on-forward circuit by depressing the correct lever first rotates the on-off rotary relay 39 from the off position to the on. This in turn first rotates the success gears 40 mounted on the ends of shaft 42 which is so geared as to advance the score card 30 by engagement with grooves 43 one unit to the student's left along a success row 44 for each off-on sequence of the rotary relay 39, the advancement occurring entirely with the "on" part of the sequence, and, second, activates the forward relay 45 which turns the tape recorder on in a forward (play back) direction. It should be noted that the dimensions, and the positioning of members 13, 20 and 28 with respect to the attempt gear 23 and the positioning of the flexible contact 33 with respect to the receiving contact 34 is such that the movement of the attempt gears 23 is complete before the two contacts meet. The attempt gear 23 is in position and stationary by the time the rotary relay 39 starts to turn the success gear 40. This avoids the binding that would occur if both sets of gears rotated together. In addition, it allows the elongated success gear slots to serve as guides when the attempt gear is operating and vice versa. The score card may, for example, be set up for 10 questions, so that after 20 attempts the score card will strike the attempt score card arrest 56 and hence lock the attempt gears 23 and answer lever and so that for all numbers of attempts up to 20 the forward contact cluster 36 remains in contact with the forward insert 35 until the last question. When, in the embodiment pictured in FIG. 4, at the end of the ten questions, the student's score is below a predetermined amount, (such as 70, the score being determined by multiplying success/attempt ratio by 100) the previously separated reverse insert 37 and reverse contact cluster 38 engage each other while the forward insert and contact clusters are disengaged. This will result in the activation of the on-reverse circuit and effect the reversal of the tape until an off-reverse slot 57 passes under the off-reverse contact 58 and activates the off-reverse circuit and switches off the tape recorder at a predetermined position wherein the first question in the series is again exposed. The score card 30 would then be reset by depressing lever 15 (FIGS. 1 and 2), and the student would then start the series of questions again and the score card 30 would indicate a new score. The reverse circuit (FIG. 5) comprises a connection from the reverse relay 66 to the reverse contact cluster 38, a connection from reverse contact cluster 38 to off reverse contact 58, a connection from contact 67 to the rotary relay 39, a connection from the rotary relay 39 to the reverse relay 66 and to the reverse contact cluster 38. Since the off forward and the off reverse circuits are both wired through the respective conducting inserts in the score card 30 one is open while the other is closed and hence the off forward slots in the tape will have no effect while the tape recorder reverses and the off reverse slots 57 will have no effect while the tape recorder advances.

When the ten questions have been correctly answered the score card 30 will have advanced to the student's left until the score card arrests 59 stop the score card 30. Since this will lock the off-on rotary relay 39 any attempt to restart the tape recorder must be preceded by a depression of the reset handle 15 (FIGS. 1, 2 and 8) depressing frame 60 which will disengage the score card 30 from the teeth of the attempt and success gears 23 and 40, and allow the score card retaining springs 61 or equivalent devices to reset score card against the reset position arrests 62. As shown in FIG. 8, reset handle 15 may be connected to frame 60, by means such as a reset plate 63. The cycle would then be ready to repeat for the next series of questions.

As shown in FIG. 8, the score card 30 is mounted on frame 60. Frame 60 moves both laterally and longitudinally. Operation of lever 15 depresses frame 60 and card 30 against the action of springs 61, thus disengaging gears 23 and 40 from grooves 31 and 43, respectively. The movement of frame 60 is then controlled by springs 61. The entire frame 60 can be replaced by employing a stiff score card and springs positioned as to urge the score card slots against the gear teeth.

Note that the student can be sent back to review at any level of competency by varying the area and relative position of the on-forward 35 insert and on-reverse 37 insert on the score card. To facilitate this variation the inserts can be made in sections that snap into place (not shown). The reverse inserts might also be replaced by or augmented with an insert that would complete a circuit to e.g. turn on an additional light source revealing extra information when the level of competence drops.

It should also be noted that the score card could be made in the form of a cylinder and still perform all of the functions described here. In some viewer designs the more compact form of the cylinder might be advantageous. In addition, success gears 40 and attempt gears 23 could also be positioned beneath score card 30.

The Tape Teacher is designed to be attached to and used with a standard tape recorder. The Tape Teacher may be clamped or screwed to the tape recorder housing. The auxiliary magnetic head and switch are attached by cutting the leads from the principal magnetic head and wiring the switch between them making connections as shown in FIG. 3. The forward and reverse solenoid switches may be attached externally to operate the manual controls (e.g., by depressing buttons) when the automatic reverse is desired. Since the form and positioning of these controls varies so greatly, no single positioning of the forward and reverse solenoid switches is shown here.

By virtue of being designed to employ any standard tape recorder as both the program advancing mechanism and the sound system, the teaching machine of the present invention offers many advantages. The mass production of the traditionally most complex and expensive components (sound system and program transport) should result in the lowering of initial cost of the system—even when no tape recorder is already available. When, as in language laboratories or in many private homes, a tape recorder is already available, the initial cost, of course, is dramatically cut. Maintenance for this most complex part of the system can be done by any local tape recorder repair shop.

In addition, by virtue of several mechanially simple and functionally unique features and of taking full advantage of the inherent features of the tape recorder proper, the Tape Teacher of my invention offers a versatility and flexibility not found in any of the prior art of comparable cost and complexity:

(1) The Tape Teacher can present material to be learned and/or questions and/or feed back separately in any sequence or simultaneously through audio and/or visual media.

(2) The Tape Teacher offers convenient and compact storage of large amounts of instructional material in both media.

(3) The Tape Teacher has "clue shutters" which may give hints or reveal what was wrong with the incorrect answer chosen or give added reinforcement when the correct answer is chosen. Critics of teaching machines have often pointed out that the machine is unable to discuss with the student as the teacher can. The "clue shutter" feature provides as many complete pupil machine exchanges as there are choices for each question asked.

(4) The Tape Teacher incorporates a "score-card" which exhibits a continuous report on the level of the student's performance computed from both the number of attempts and the number of correct responses, can give special notice of below-par performance, and constitutes a "decision-making" center and switching apparatus needed to return the student to a lower level of difficulty by reversing the program when a student falls below an instructor-determined level of proficiency.

(5) The Tape Teacher incorporates an auxiliary magnetic head which, when coupled with a switch which disconnects the principal head of the tape recorder and connects the auxiliary head, will allow for immediate feed back on the correctness of, for example, a pronunciation. Most language laboratories (a principal possible use for the Tape Teacher) now use two-track tape recorders which allow a student to listen to a pre-recorded word to be pronounced on one track, pronounce the word, recording on the other track, and then reverse and play back both tracks for a self-audit comparison with the instructor. With the Tape Teacher no reverse would be needed. The student would merely switch in the auxiliary magnetic head immediately after pronouncing the word and audit both the instructor's example and his own attempt. Such an arrangement would provide for more immediate feedback on the correctness of a student's pronunciation and eliminate the inconvenience and loss of time to the student and the wear and tear on the tape recorder caused by the switching to "reverse," waiting until the tape has reversed enough (which in most cases is either too much—hence more waiting and greater feedback delay—or necessitates a trial playback in order to discover that it is not yet reversed enough) and then switching to "playback" for the self-audit feedback. In some systems the student pronounces a whole series of words and then audits them after the series is finished with a single playback. Although this overcomes some of the disadvantages of a reversal and play-back for each word, it both lengthens grossly the time between pronunciation and the self-audit feedback and introduces other material between the pronunciation and the self-audit feedback. Both conditions generally inhibit learning and retention. The elimination of the dead waiting time also helps to keep the student's attention from wandering. It may be pointed out that the two-head system requires that a substantial fraction of the tape be wasted (i.e. remain unrecorded). However, in this system the portions of the tape that are unrecorded might well be printed, e.g. when the student audits his own voice in comparison with the instructor's voice he may simultaneously view the regular or phonetic spelling of the word, thus again reinforcing the relationship between the written and spoken word.

It will be understood that the description describes a preferred embodiment and that various changes and modifications may be made without departing from the spirit of the disclosure or the scope of the appended claims. For example, the "windows" 9, 10 and 52 and mirror 53 may have special optical properties. Also contacts 51, 58 ond 67 may be replaced with arrangements, such as a light source and photo-electric cell. Furthermore, the slots in the tape may be replaced by inlays, overlays or impregnations of electrically conducting or magnetically permeable material.

I claim:

1. A teaching machine having a tape with audio and visual recorded matter thereon which comprises:

a tape recorder having tape advancing and reversing means and at least one sound recording and reproducing head;

means to view visually said visually recorded matter on said tape;

means to advance said tape in a forward direction; said means comprising a first indicia on said tape and means controlled by said first indicia for stopping said tape, student operable means for selecting predetermined indicia on said tape, said student operable means cooperating with said predetermined indicia to operate an operable means to advance said tape in a forward direction, a second indicia on said tape and means controlled by said second indicia for stopping said tape; and means to reverse said tape to a former position, said reversing means comprising a means for determining the ratio of incorrect student selection of said predetermined indicia on said tape, and means responsive to said determining means reaching a predetermined value to override said means to advance said tape in a forward direction and to reverse said tape; and student operable means to reset said means for determining the ratio of incorrect student selection.

2. A structure according to claim 1 including a third indicia on said tape and means controlled by said third indicia for stopping said tape while the tape is moving in a reverse direction.

3. A structure according to claim 1 wherein said visual recorded matter on said tape comprises questions and answers, and correct answers are correlated with said predetermined indicia.

4. A structure according to claim 1 wherein said visual recorded matter on said tape includes means that will enable a student to select a correct answer after having made an incorrect selection.

5. A structure according to claim 1 including means to indicate a score of correct selections relative to incorrect selections.

References Cited

UNITED STATES PATENTS

| | | | |
|---|---|---|---|
| 3,095,654 | 7/1963 | Cummings | 35—9 |
| 3,176,927 | 4/1965 | Irazoqui. | |
| 3,191,315 | 6/1965 | Hannah | 35—9 |

JEROME SCHNALL, *Primary Examiner.*

EUGENE R. CAPOZIO, *Examiner.*

R. W. WEIG, *Assistant Examiner.*